United States Patent
Coue et al.

(10) Patent No.: US 11,772,343 B2
(45) Date of Patent: Oct. 3, 2023

(54) FUNCTIONALIZED LAMINATED OPTICAL ELEMENT WITH IMPROVED EDGING RESISTANCE

(71) Applicants: ESSILOR INTERNATIONAL, Charenton-le-Pont (FR); NITTO DENKO CORPORATION, Osaka (JP)

(72) Inventors: Violaine Coue, Charenton-le-Pont (FR); Catherine Berger, Charenton-le-Pont (FR); Manuela Desousa, Charenton-le-Pont (FR); Tatsuya Suzuki, Osaka (JP); Katsuhiko Kamiya, Osaka (JP); Kiyoe Shigetomi, Osaka (JP); Shinji Hoshino, Osaka (JP); Junichi Nakayama, Osaka (JP)

(73) Assignee: Essilor International, Charenton-le-Pont (FR)

( * ) Notice: Subject to any disclaimer, the term of this patent is extended or adjusted under 35 U.S.C. 154(b) by 93 days.

(21) Appl. No.: 16/089,143

(22) PCT Filed: Mar. 29, 2016

(86) PCT No.: PCT/IB2016/000529
§ 371 (c)(1),
(2) Date: Sep. 27, 2018

(87) PCT Pub. No.: WO2017/168192
PCT Pub. Date: Oct. 5, 2017

(65) Prior Publication Data
US 2019/0111641 A1 Apr. 18, 2019

(51) Int. Cl.
| | |
|---|---|
| *B29D 11/00* | (2006.01) |
| *B32B 7/12* | (2006.01) |
| *G02B 1/14* | (2015.01) |
| *G02B 1/10* | (2015.01) |
| *G02B 1/11* | (2015.01) |

(52) U.S. Cl.
CPC .... *B29D 11/0073* (2013.01); *B29D 11/00865* (2013.01); *B32B 7/12* (2013.01); *G02B 1/10* (2013.01); *G02B 1/11* (2013.01); *G02B 1/14* (2015.01)

(58) Field of Classification Search
CPC ................................. B29D 11/0073
See application file for complete search history.

(56) References Cited

U.S. PATENT DOCUMENTS

| | | | | |
|---|---|---|---|---|
| 6,441,092 | B1 * | 8/2002 | Gieselman | C09J 133/08 525/218 |
| 6,518,343 | B1 * | 2/2003 | Lucast | C09J 171/02 524/277 |
| 2006/0169407 | A1 | 8/2006 | Jiang | |
| 2007/0195422 | A1 * | 8/2007 | Begon | B29C 66/81264 359/642 |
| 2007/0196646 | A1 * | 8/2007 | Matano | B32B 27/306 428/355 AC |
| 2008/0023138 | A1 | 1/2008 | Zheng | |
| 2009/0155582 | A1 * | 6/2009 | Habassi | G02B 1/11 428/336 |
| 2010/0097705 | A1 * | 4/2010 | Furui | G02B 5/0278 359/599 |
| 2010/0110567 | A1 * | 5/2010 | Glacet | G02B 5/3041 156/196 |
| 2010/0182679 | A1 | 7/2010 | Han et al. | |
| 2011/0111220 | A1 | 5/2011 | Takarada et al. | |
| 2011/0195240 | A1 * | 8/2011 | Inenaga | G06F 3/041 428/343 |
| 2011/0223418 | A1 * | 9/2011 | Habassi | B29D 11/00432 156/182 |
| 2012/0013979 | A1 * | 1/2012 | Biteau | G02B 27/288 359/465 |
| 2012/0028442 | A1 | 2/2012 | Takamoto et al. | |
| 2012/0184680 | A1 * | 7/2012 | Akiyama | C09J 133/14 525/218 |
| 2013/0005909 | A1 | 1/2013 | Natsui et al. | |
| 2013/0005910 | A1 | 1/2013 | Okamoto et al. | |

(Continued)

FOREIGN PATENT DOCUMENTS

| | | |
|---|---|---|
| CN | 101600771 | 12/2009 |
| CN | 102373022 | 3/2012 |

(Continued)

OTHER PUBLICATIONS

Mitzutani—WO 2014091863 A1—ISR D#2—WO doc—Biblio+Google—2014 (Year: 2014).*
Pebax-elastomer-brochure (Year: 2018).*
International Search Report and Written Opinion issued in International Patent Application No. PCT/IB2016/000529, dated Nov. 29, 2016.
"Delamination/Peel Strength Testing" Nicol Scales & Measurement, Jul. 12, 2016, https://nicolscales.com/linked-contenUknowledge-center/testing-types/delaminationpeel-stength-testing/.
Yang et al., "The Role of Viscoelastic Properties in the Design of Pressure-sensitive Adhesives" TRIP 1997, vol. 5, No. 11,380-384.

*Primary Examiner* — John Vincent Lawler
(74) *Attorney, Agent, or Firm* — Norton Rose Fulbright US LLP

(57) ABSTRACT

The invention relates to a functionalized laminated optical element comprising: —An optical base element; —A functional film structure consisting of a single layer or a multi-layer structure; —A layer of a pressure-sensitive adhesive of optical quality, placed between one surface of the optical base element and the functional film structure so as to permanently retain said functional film structure on the surface of the optical base element. Said functionalized laminated optical element maintains its integrity after typical processing of an optical article which includes wheel edging. More particularly the invention relates to the use of a specific adhesive system for improving the wheel edging resistance of functionalized laminated optical element. The functional laminated optical may be an ophthalmic lens.

19 Claims, No Drawings

(56) References Cited

U.S. PATENT DOCUMENTS

| | | | |
|---|---|---|---|
| 2013/0005911 A1* | 1/2013 | Okamoto | C08F 120/18 |
| | | | 525/210 |
| 2014/0034222 A1 | 2/2014 | Jiang et al. | |
| 2014/0037951 A1* | 2/2014 | Shigetomi | C09J 4/06 |
| | | | 428/355 AC |
| 2015/0079387 A1 | 3/2015 | Yang et al. | |
| 2015/0331259 A1 | 11/2015 | Jiang et al. | |
| 2015/0346408 A1* | 12/2015 | Mizutani | B32B 37/12 |
| | | | 428/41.5 |

FOREIGN PATENT DOCUMENTS

| CN | 104321396 | 1/2015 | |
|---|---|---|---|
| CN | 104507664 | 4/2015 | |
| EP | 1917136 | 5/2008 | |
| EP | 2170584 | 1/2011 | |
| EP | 2551319 | 1/2013 | |
| JP | 2008/529077 | 7/2008 | |
| JP | 2011/099073 | 5/2011 | |
| JP | 2011/116916 | 6/2011 | |
| JP | 2012/233060 | 11/2012 | |
| JP | 2016/507774 | 3/2016 | |
| WO | WO 2003/004255 | 1/2003 | |
| WO | WO 2006/105999 | 10/2006 | |
| WO | WO 2011/053329 | 5/2011 | |
| WO | WO 2011/118183 | 7/2013 | |
| WO | WO-2014091863 A1 * | 6/2014 | B32B 37/12 |
| WO | WO 2015/113791 | 6/2015 | |

* cited by examiner

FUNCTIONALIZED LAMINATED OPTICAL ELEMENT WITH IMPROVED EDGING RESISTANCE

CROSS-REFERENCE TO RELATED APPLICATIONS

This application is a national phase application under 35 U.S.C. § 371 of International Application No. PCT/IB2016/000529 filed 29 Mar. 2016, the entire contents of which is specifically incorporated by reference herein without disclaimer.

The invention relates to a functionalized laminated optical element which maintains its integrity after typical processing of an optical article which includes wheel edging. More particularly the invention relates to the use of a specific adhesive system for improving the wheel edging resistance of functionalized laminated optical element. The functional laminated optical may be an ophthalmic lens.

It is known to modify the optical, transmission or mechanical properties of optical base element by laminating, i.e to assemble by gluing, functional films onto the surface of said optical base element. However adhesion between functional films and optical element remains a long standing problem within the industry.

The adhesive system used between the functional films and the optical element needs to be ease of use, of good optical quality but also needs to provide a tough and durable adhesion during the successive stages of manufacturing said optical element.

The functionalized laminated optical element after the lamination process is indeed commonly at least coated and trimmed so that its outline fits the shape of the frame that receives it. More particularly during the process of manufacturing ophthalmic lenses, it is common to also surface/grind and polish the lens to a specific power. The step of coating may comprise surface preparations, in particular in the presence of water. The step of peripheral machining or edging may also implement a standard method including at least one step of grinding in which the lens is subjected to mechanical stresses and most often in the presence of water. Such conditions very often lead to delamination between the functional film and the optical base element.

This adhesion issue is even more problematic in connection either with certain materials used to make organic optical elements or certain materials used to make films.

The aim of the present invention therefore consists in providing a functionalized laminated optical element, in particular a functionalized laminated ophthalmic lens, which exhibits a strong adhesion between the functional film and the optical base element and which resists to the further treatments that could be applied to the element after the lamination process. More particularly it is an object of the present invention to provide a functionalized laminated optical element which exhibits an improved wheel edging resistance.

The present invention is based on the discovery that the use of a very specific type of pressure sensitive adhesive enables to efficiently prevent the delamination issue of the functional laminated optical element. As a matter of fact the Applicants observed that delamination especially during edging could be avoided when pressure sensitive adhesives having a rather low storage modulus and demonstrate a certain threshold value for the adhesion strength to the optical base element value were used.

The subject matter of the present invention therefore is a functionalized laminated optical element comprising:

An optical base element;
A functional film structure consisting of a single layer or a multilayer structure;
A layer of a pressure-sensitive adhesive of optical quality, placed between one surface of the optical base element and the functional film structure so as to permanently retain said functional film structure on the surface of the optical base element,
Wherein said pressure-sensitive adhesive layer has a storage modulus G' below $1.6 \cdot 10^5$ Pa at 85° C. and demonstrates a dry peel force strength and a wet peel force strength both above 20 N/25 mm, preferably both in the range of 21 to 40 N/25 mm inclusive.

The expression "edging" means mechanical shaping of the perimeter of an optical element using a cutting tool, a grinding tool, a milling tool or a turning tool typical in the optical industry without or with water (wet edging). In particular the edging tool can be a milling tool such as a milling cutter, a milling drill or an edging wheel (wheel edging).

For the purposes of the invention, the expression "optical base element" is understood to mean a colorless or tinted transparent element having a transmission factor (Tv) in the visible light spectrum of between 99% and 8%.

For the purpose of the invention, an optical element is considered to be transparent when the observation of an image through this element is perceived without significant loss of contrast. Stated otherwise, the inter-position of a transparent optical element between an image and an observer of the latter does not significantly reduce the quality of the image. In the ophthalmic domain, this definition is considered as met at least once the optical element has a haze no greater than 1, preferably no greater than 0.4. This definition of the term transparent is applicable, within the meaning of the invention, to all the objects regarded as such in the description.

The optical article is herein defined as one of an ophthalmic lens, an ocular visor, and sight optical systems. Non-limiting examples of ophthalmic elements include corrective and non-corrective lenses, including single vision or multi-vision lenses, which may be either segmented or non-segmented, as well as other elements used to correct, protect, or enhance vision, including without limitation magnifying lenses and protective lenses or visors such as found in spectacles, glasses, goggles and helmets.

The optical base element may be a standard component selected from the group consisting of optical lenses, windows, visors, preferably optical lenses, more preferably ophthalmic lenses.

The optical base element may be selected from the group consisting of a finished lens, a semi-finished lens, a progressive addition lens, an afocal lens, a plano lens, a unifocal lens, and a multifocal lens.

A semi-finished lens (SF) means a lens with one optical surface and another surface that needs to be ground to the wearer's prescription.

The optical base element could be made from any material classically used in optics. In particular the optical base element is made from plastic which could be thermoplastic or thermoset material. An exemplary of plastics includes polycarbonates; polyamides; polyimides; polysulfones; copolymers of polyethylene terephthalate and polycarbonate; polyolefins, namely polynorbornenes; polymers and copolymers of diethylene glycol bis(allylcarbonate); (meth)acrylic polymers and copolymers, namely (meth)acrylic polymers and copolymers derived from bisphenol-A; thio (meth)acrylic polymers and copolymers; urethane and thiourethane polymers and copolymers; epoxy polymers and copolymers; and episulfide polymers and copolymers. In a preferred embodiment the optical base element is made from polycarbonate or a high index poly(thio)urethanes with light refractive index of between 1.60 and 1.67 or episulfides with light refractive index of between 1.60 and 1.67. More preferably the optical base element is made from (thio) urethane based pre-polymer or an episulfide monomer.

The functional film structure useful for the present invention includes at least one functional film. In other words, the functional film structure may include one or more functional films, the functional film structure may include different functionalities.

Various types of functional films may be employed. Examples of functional films include tinted films, polarizing films, photochromic films, hard coat films, top coat films, anti-fog films, anti-smudge films, anti-reflective films or anti-static films. The functional film may be of single layer or multilayer structure. In other words it refers to a single functional film or a stratified structure comprising at least one support film and one or more individual functional layers (coatings or film) having identical or different characteristics that are adhered together.

Thus according to one embodiment the functional film may comprise a support film, said support film being adapted to be able to be adhered or being fixed to the optical base element by means of an adhesive layer.

Materials of the support film may be selected from the group of films made of cellulose triacetate (TAC), cellulose acetate butyrate (CAB), polycarbonate (PC), poly(ethylene terephthalate) (PET), poly(methylmethacrylate) (PMMA), urethane polymer (TPU), cycloolefin copolymer (COC), polyether block amide block copolymer, and Polyimides.

Preferably the support film is made of cellulose triacetate (TAC) and has a thickness of at least 40 microns, preferably a thickness in the range of 40 µm to 300 µm inclusive and preferably a thickness of 80 to 190 µm.

One interesting application of the invention is to provide a final optical element, more particularly an ophthalmic lens with anti-reflective function.

The functional film structure with anti-reflective function may comprise, preferably is constituted of, a functional film comprising a support film in cellulose triacetate, and an anti-reflective interferential stack made of a succession of oxide coatings, generally separated from the support film by a hard coat layer, or said functional film may comprise a support film in cellulose triacetate, a surface of which comprises microstructures forming anti-reflective interferential microstructures, or said functional film may comprise a support film in cellulose triacetate to which is affixed a multilayered optical film composed of a succession of thermoplastic films of varying refractive index.

Another interesting application of the invention is to provide a final optical element, more particularly an ophthalmic lens with polarizing function.

In that case, the functional film structure with polarizing function is typically constituted of a functional film comprising a polyethyleneterephthalate film (PET) or polyvinylacetate film (PVA) as polarizing film which may be encapsulated by two protective films or sandwiched between two protective films, one of said protective films being the support film.

Thus, according to one embodiment of the present invention, the functional film structure comprises a polarizing layer and two protective films, the polarizing layer being sandwiched between said protective films.

In case of functional film structure comprises two protective films the materials of the protective films may be identical or different and are selected from the group of films made of cellulose triacetate (TAC), cellulose acetate butyrate (CAB), polycarbonate (PC), poly(ethylene terephthalate) (PET), poly(methylmethacrylate) (PMMA), urethane polymer (TPU), cyclo olefin copolymer (COG), polyether block amide block copolymer, and Polyimides, preferably identical and made of cellulose triacetate (TAC).

According to this embodiment, the protective film which is the support film of the functional film structure i.e the film disposed on the opposite side of the pressure adhesive layer and closest from the optical base element is made of cellulose triacetate (TAC) and has a thickness of at least 40 µm, preferably having a thickness in the range of 40 µm to 300 µm inclusive and preferably a thickness of 80 to 190 µm.

Such functional film structure with polarizing function useful for the present invention are typically those described in patent applications PCT/US09/62923 or PCT/EP2015/050253.

By "pressure-sensitive adhesive" it is meant a dry contact adhesive of viscoelastic nature which only needs a very slight pressure to adhere to the surfaces it is between.

By "layer of a pressure-sensitive adhesive" it is meant a layer made of pressure-sensitive adhesive or made of pressure-sensitive adhesive.

Pressure sensitive adhesives are characterized by their ability to require no activation by water, solvent or heat to exert a strong adhesive holding force toward a surface.

Pressure sensitive adhesives may be available in the form of a continuous layer made of a pressure sensitive adhesive composition (i.e the pressure sensitive adhesive layer) on a peelable liner (i.e release liner) or sandwiched between two peelable liners. (referred to as pressure sensitive adhesive sheet, pressure sensitive adhesive tape or adhesive transfer tape)

The pressure-sensitive adhesive constituted the pressure-sensitive layer useful for the present invention should have a storage modulus G' at 85° C. below $1.6 \cdot 10^5$ Pa, preferably below or equal to 1.5, more preferably between 1.0 and $1.5 \cdot 10^5$ Pa.

85 degrees Celsius corresponds to a maximal temperature that may be applied to the optical element during a general edging step. In particular, this corresponds to maximal theoretical values of temperature generated during the edging step by friction of the edging wheel with the material of the lens when using aggressive conditions.

The storage modulus G' in the present invention is measured with a rheometer, typically the ARES Rheometer sold by TA instruments, on a test sample cut in a disc shape of a 7.9 mm diameter and about 2 mm thickness.

The test sample can be prepared by combining several pressure sensitive adhesive layers into a stack in order to form a test sample of about 2 mm thickness.

The test sample is then cut out into a disc of 7.9 mm diameter and is placed between parallel plates; and while applying a shear strain at a frequency of 1 Hz the viscoelasticity is measured in the shear mode over a temperature range of for instance −40° C. to 100° C. at a heating rate of 5° C./min.

The pressure sensitive adhesive layer useful for the present invention should also demonstrate a dry peel strength above 20 N/25 mm and a wet peel strength above 20 N/25 mm.

Preferably the pressure sensitive adhesive layer useful for the present invention exhibits both a dry peel strength and a wet peel strength in the range of 21 to 40 N/25 mm inclusive, more preferably in the range of 22 to 37 N/25 mm inclusive.

By "Peel strength" it is meant the average force per unit test-specimen width, measured along the bond line, required to separate progressively the two members of a bonded test specimen under specified conditions of test.

More particularly in the present invention it is meant the force required to remove the pressure sensitive adhesive layer from either the functional film structure or the optical base element.

The value of the peel strength indicates how strongly the pressure sensitive adhesive layer has bonded, or adhered, to the unlike substrates.

The dry peel strength and the wet peel strength are both measured according to ASTM D 3330/D 3330 M Standard Test Method by peeling off the functional film structure+ pressure-sensitive adhesive layer in the 90° peeling off direction at a speed of 2.54 cm/min.

The equipment used for such test is typically a traction machine distributed by Instron®.

The peel test consists more specifically of laminating a strip of the pressure-sensitive adhesive layer 25×70 mm in size on a strip of the functional film structure. The resulting strip (i.e the functional film structure+pressure-sensitive adhesive layer) is then bonded onto a support onto which the optical element has been previously attached. The laminated optical element (i.e the tested sample) is conditioned at least 24 hours (at 23 C±3 C, 50% RH±10%) before peeling.

The functional film structure+pressure sensitive adhesive material is then peeled at an angle of 90° at a speed of 2.54 cm/min.

Halfway through the test, at least after 30 mm of dry peeling, a few drops of water optionally containing a wetting agent are added to the interface or the crack opening for measuring the wet peel force.

Software continuously measures the peel force according to displacement. This value of the peel force is averaged over a length of 10 mm for dry peeling and 15 mm for wet peeling. The forces under dry and wet conditions are both expressed in N/25 mm.

In a preferred embodiment of the present invention, the pressure-sensitive adhesive layer demonstrates a decrease between the dry peel force strength and the wet peel force strength less than or equal to 10% inclusive.

The pressure-sensitive adhesive layer useful for the present invention has preferably a thickness in the range of 10 μm to 150 μm inclusive, preferably of 20 to 75 μm inclusive.

The typical pressure-sensitive adhesive of optical quality useful for the present invention comprises a tackifier.

The typical pressure-sensitive adhesive of optical quality useful for the present invention further comprises advantageously a silane coupling agent. Thus the pressure-sensitive adhesive of optical quality useful for the present invention is preferably made from a composition comprising a silane coupling agent and a tackifier or tackifier agent.

The typical pressure-sensitive adhesive of optical quality useful for the present invention is an acrylic pressure sensitive adhesive. More precisely the layer of pressure-sensitive adhesive of the present invention is preferably made of a poly(meth)acrylate-based composition.

Advantageously the layer of the pressure-sensitive adhesive of optical quality useful for the present invention is made of a poly(meth)acrylate-based composition comprising an acrylic polymer (A) and comprising a silane coupling agent.

The presence of both a silane coupling agent and a tackifier in the composition of the pressure-sensitive adhesive enables to get a functionalized laminated optical element with an even better wheel edging resistance.

Preferred pressure-sensitive adhesive that may be used for the present invention are made of a poly(meth)acrylate-based composition comprising an acrylic polymer (A); a (meth) acrylic polymer (B), acting as a tackifier, that includes, as a monomer unit, a (meth) acrylic monomer having a tricyclic or higher alicyclic structure and that has a weight average molecular weight of 1000 or more and less than 30000; and an alkoxysilyl group containing monomer (C) acting as silane coupling component.

In this preferred embodiment, the content of the (meth) acrylic polymer (B) is preferably within a range of 1 to 20 parts by weight, and preferably within the range of 2 to 15 parts, and more preferably 3 to 10 parts by weight, based on 100 parts by weight of the acrylic polymer (A) and the content of the alkoxysilyl group containing monomer (C) is preferably within the range of 0.1 to 1 part by weight, based on 100 parts by weight of the acrylic polymer (A).

The acrylic polymer (A) contains, for example, approximately 50% by weight or more of (meth) acrylic acid alkyl ester having a linear or branched-chain C1-20 alkyl group as a monomer unit.

Examples of the (meth)acrylic acid alkyl ester having a C1-20 alkyl group include, for example: (meth) acrylic acid C1-20 alkyl esters, (meth) acrylic acid esters having an alicyclic hydrocarbon group, etc.

Another monomer component (copolymerizable monomer) that is copolymerizable with the (meth)acrylic acid alkyl ester can be used for the preparation of acrylic polymer (A). Accordingly, the acrylic polymer (A) may contain a copolymerizable monomer along with the (meth) acrylic acid alkyl ester as a major component. A monomer having a polar group can be preferably used as the copolymerizable monomer.

When the acrylic polymer (A) contains a copolymerizable monomer along with the (meth) acrylic acid alkyl ester as a major component, hydroxyl group-containing monomers can be preferably used. Among them, an 2-hydroxyethyl (meth)acrylate or 4-hydroxybutyl (meth)acrylate can be preferably used.

Other examples of copolymerizable monomers include the one cited in paragraph [0019] of EP 2 551 319. Thus examples of copolymerizable monomers useable in the present invention include Specific examples of the copolymerizable monomer include carboxyl group-containing monomers; hydroxyl group-containing monomers; acid anhydride group-containing monomers; sulfonic acid group-containing monomers; phosphate group-containing monomers; (N-substituted)amide monomers; succinimide monomers; maleimide monomers; itaconimide monomers; vinyl esters; nitrogen-containing heterocyclic monomers; cyanoacrylate monomers; (meth)acrylic acid aminoalkyl monomers; (meth)acrylic acid alkoxy alkyl monomers; styrene monomers; epoxy group-containing acrylic monomers; glycol acrylic ester monomers; vinyl ether monomers; vinyl esters; olefins or dienes; vinyl ethers; vinyl chloride; (meth) acrylic acid alkoxy alkyl monomers; sulfonic acid group-containing monomers; imide group-containing monomers; isocyanate group-containing monomers. These copolymerizable monomers can be used alone or in combination of two or more thereof. A polyfunctional monomer may also be contained in the acrylic polymer (A).

Examples of the polyfunctional monomer include, for example: trimethylolpropane tri(meth)acrylate, hexanediol di(meth)acrylate, and dipentaerythritol hexa(meth)acrylate can be preferably used. The polyfunctional (meth)acrylates can be used alone or in combination of two or more thereof. Examples of monomers forming the (meth) acrylic polymer (B) include alkyl (meth)acrylate such as methyl (meth) acrylate, ethyl (meth)acrylate, propyl (meth)acrylate, isopropyl (meth)acrylate, butyl (meth)acrylate, isobutyl (meth) acrylate, sec-butyl (meth)acrylate, tert-butyl (meth)acrylate, pentyl (meth)acrylate, isopentyl (meth)acrylate, hexyl (meth)acrylate, 2-ethylhexyl (meth)acrylate, heptyl (meth) acrylate, octyl (meth)acrylate, isooctyl (meth)acrylate, nonyl (meth)acrylate, isononyl (meth)acrylate, decyl (meth) acrylate, isodecyl (meth)acrylate, undecyl (meth)acrylate, and dodecyl (meth)acrylate; an ester of (meth)acrylic acid and an alicyclic alcohol, such as cyclohexyl (meth)acrylate, isobornyl (meth)acrylate, and dicyclopentanyl (meth)acrylate; aryl (meth)acrylate such as phenyl (meth)acrylate and benzyl (meth)acrylate; and a (meth)acrylate derived from a terpene compound derivative alcohol. These (meth)acrylates may be used solely as one species or in combination of two or more species. From the standpoint of further increasing the adhesiveness, the (meth) acrylic polymer (B) preferably comprises, as a monomeric unit, an acrylic monomer having a relatively bulky structure, typified by an alkyl (meth) acrylate having a branched alkyl group, such as isobutyl (meth)acrylate, tert-butyl (meth)acrylate, etc.; an ester of a (meth)acrylic acid and an alicyclic alcohol, such as cyclohexyl (meth)acrylate, isobornyl (meth)acrylate, dicyclopentanyl (meth)acrylate, etc.; or an aryl (meth)acrylate such as phenyl (meth)acrylate, benzyl (meth)acrylate, etc. When UV light is used in synthesizing the (meth)acrylic oligomer or forming the PSA layer, a saturated oligomer is preferable because it is less likely to inhibit polymerization. An alkyl (meth)acrylate having a branched alkyl group or an ester of an alicyclic alcohol is preferably used as a monomer constituting the (meth)acrylic oligomer.

From these points of view, preferable examples of the (meth)acrylic oligomer include the respective homopolymers of dicyclopentanyl methacrylate (DCPMA), cyclohexylmethacrylate (CHMA), isobornyl methacrylate (IBXMA), isobornyl acrylate (IBXA), dicyclopentanyl acrylate (DCPA), 1-adamanthyl methacrylate (ADMA), and 1-adamanthyl acrylate (ADA); as well as a copolymer of CHMA and isobutyl methacrylate (IBMA), a copolymer of CHMA and IBXMA, a copolymer of CHMA and acryloyl morpholine (ACMO), a copolymer of CHMA and diethylacrylamide (DEAA), a copolymer of ADA and methyl methacrylate (MMA), a copolymer of DCPMA and IBXMA, a copolymer of DCPMA and MMA, etc.

The monomers forming the (meth) acrylic polymer (B) include more preferably (meth) acrylic monomers having a tricyclic or higher alicyclic structure.

Examples of (meth) acrylic monomers having a tricyclic or higher alicyclic structure useful in the present invention include those cited in EP 2 551 319.

Examples of (meth) acrylic monomers having a tricyclic or higher alicyclic structure (B) include preferably dicyclopentanyl methacrylate, dicyclopentanyl acrylate, dicyclopentanyl oxyethyl methacrylate, dicyclopentanyl oxyethyl acrylate, tricyclopentanyl methacrylate, tricyclopentanyl acrylate, 1-adamantyl methacrylate, 1-adamantyl-acrylate, 2-methyl-2-adamantyl methacrylate, 2-methyl-2-adamantyl acrylate, 2-ethyl-2-adamantyl methacrylate, 2-ethyl-2-adamantyl acrylate. These monomers can be used alone or in combination.

Another copolymerizable monomer compatible with such (meth)acrylic polymer may be used in combination. Accordingly, the (meth) acrylic polymer (B) may contain a copolymerizable monomer along with the (meth)acrylic monomer having a tricyclic or higher alicyclic structure as a major component.

Example of alkoxysilyl group containing monomer (C) preferably can be used include epoxy group-containing silane coupling agents or amino group-containing silane coupling agents.

Example of epoxy group-containing silane coupling agents include gamma-glycidoxypropyltrimethoxysilane, gamma-glycidoxypropyltriethoxysilane.

Example amino group-containing silane coupling agents include gamma-aminopropyltrimethoxysilane and N-phenyl-aminopropyltrimethoxysilane.

Alkoxysilyl group containing monomer (C) acting as silane coupling agent (C) may be preferably selected in the group constituted of gamma-glycidoxypropyltrimethoxysilane, gamma-glycidoxypropyltriethoxysilane, gamma-aminopropyltrimethoxysilane and N-phenyl-aminopropyltrimethoxysilane. Again what is essential is that the functionalized laminated optical element of the present element is the presence of a pressure-sensitive adhesive layer having a storage modulus G' below 1.6 $10^5$ Pa at 85° C., preferably below or equal to 1.6 $10^5$ Pa and demonstrating a dry peel strength and a wet peel force strength both above 20 N/25 mm, preferably both in the range of 21 to 40 N/25 mm inclusive.

The functionalized laminated optical element according to the present invention thus exhibits a very strong adhesion between the lens and the functional film structure. There is no delamination even after a severe Rx surfacing, polishing and more particularly wet edge cutting. In other words the element remains intact and no separation occurs between the different layers even during the process of edging.

The functionalized laminated optical element may further comprise a functional coating on the functional structure element. Examples of coatings include protective coating, hard coating, anti-reflective coating, photochromic coating, tinted coating, anti-fog coating and anti-smudge coating.

Another object of the present invention is the method for manufacturing such functionalized laminated optical element as described above.

Thus the present invention also relates to a method for manufacturing a functionalized laminated optical element comprising the steps of forming an edging-optimized functionalized laminated optical base element by:
  i. providing an optical base element;
  ii. providing a layer of a pressure-sensitive adhesive of optical quality;
  iii. providing a functional film structure; and
  iv. laminating said functional film structure to the optical base element, with said a layer of a pressure-sensitive adhesive of optical quality disposed between said functional film structure and said optical base lens so as to retain permanently said film layered structure on the surface of said optical base lens;
  wherein said layer of a pressure-sensitive adhesive of optical quality has a storage modulus G' below 1.6 $10^5$ Pa at 85° C. and demonstrates both a dry peel force strength and a wet peel force strength above 20 N/25 mm, preferably both in the range of 21 to 40 N/25 mm inclusive.

All the features (individually or in combination) described above for the different elements of the functionalized laminated optical element of course apply to the method of manufacturing said functionalized laminated optical element.

Lamination involves a combination of pressure and heat applied over a short period of time. Various systems and processes are known within the optics industry to provide a precise and uniform amount of pressure across optical surfaces. An exemplary listing of lamination systems that may be employed in the present invention include the following.

So-called "hot press" or "hot-air" systems may be used for lamination. An accumulator device having a lens support may be set-up to apply pressure, with the set-up then placed into an oven. An FST (Front Side Transfer) process may be used, as described in EP 1917136. An BST (Back Side Transfer) process may be used, as described in WO2003/004255. Other HMC film lamination systems may be used. A process, as described in WO2006/105999, may be used with the addition of heat. Preferably the lamination processes as described in EP2170584 is used.

A basic laminating process would involve applying pressure greater than 10 psi, heating to at least 60 degrees Celsius, and holding for at least about 2 to 5 minutes.

Prior to the lamination step, the functional film structure may be subjected to a corona discharge treatment, a plasma treatment or a chemical treatment more specifically a caustic treatment. Alternatively or additionally, such pre-treatment may also be applied to the optical base element. Such treatments enable to improve the adhesion between the adhesion between the pressure sensitive adhesion layer and the functional film structure.

The values of dry peel strength and a wet peel force strength discussed above and claimed in the present invention of course corresponds to the values demonstrate by the pressure sensitive adhesive layer without any pretreatment of the functional film structure and/or the optical base element The method for producing the edging-optimized functionalized laminated optical base element of the present invention may for example comprise the following steps:
 a) providing an optical base element
 b) providing an functional film structure;
 b) optionally treating by plasma or corona one surface of the functional film structure and/or the convex or concave face of the base optical element;
 c) peeling off one of the two release films from the pressure sensitive adhesive layer and applying this layer against the optionally plasma-treated face of the functional film structure;
 d) peeling off the second release film from the pressure-sensitive adhesive layer and pressing the functional film structure against the convex or concave face of the base optical element so as to obtain a final assembly. Preferably, the functional film structure is deposited on the convex face of the base optical element.

In a variant embodiment of the invention, the pressure sensitive adhesive structure is first pressed against the optionally plasma-treated convex or concave face of the base optical element.

Before step d), the functional film structure is preformed prior to being pressed against the convex or concave face of the base optical element. This preforming may be performed in different ways. It notably includes a step of thermoforming during which it is heated before being deformed. The temperature of thermoforming is restricted so as not to alter the integrity of the functional film structure and so as to be able to easily conform to the shape of the convex or concave face of the base optical element. In the case where the pressure sensitive adhesive layer is first pressed against functional film structure, functional film structure is preformed with the pressure sensitive adhesive layer before the assembly is pressed against the convex or concave surface of the base optical element.

As an example the method includes the lamination of a functionally film structure comprising a TAC film as external film to an ophthalmic lens as optical base element.

As a specific example the method includes the lamination of a polarized TAC/PVA/TAC film as functionalized film structure to an ophthalmic lens as optical base element.

According to these embodiments the lens is more preferably a semi-finished lens.

The method for producing the edging-optimized functionalized laminated optical base element of the present invention may include the further steps of:

Surfacing the optical base element;

Coating the surfaced optical element; and

Edging the coated optical element,

Wherein the pressure-sensitive adhesive layer avoids separation of the functional film structure and the optical base element notably during edging, more particularly wheel wet edging.

Examples of coatings include protective coating, hard coating, anti-reflective coating, photochromic coating, tinted coating, anti-fog coating and anti-smudge coating. Thus, one or more coatings may be deposited on the surface that was not covered by the functional film structure or may also be deposited over the functional film structure after applying the film structure on the optical element.

Edging can be made for example using a KAPPA® Edger, a SIGMA Edger, a Mr Blue®, Edger distributed by Essilor©, or edgers distributed by MEI, or by Nidek, or by OPTRONIC, or by other manufacturers of edgers for ophthalmic lenses.

Still another object of the invention is a method for improving edging performance of a laminated optical element consisting of laminating a film layered structure to an optical base element with a pressure-sensitive adhesive layer of optical quality having a storage modulus G' below $1.6\ 10^5$ Pa at 85° C. and demonstrating a dry peel force strength and a wet peel force strength both above 20 N/25 mm, preferably both in the range of 21 to 40 N/25 mm inclusive, said pressure-sensitive adhesive layer placed between one surface of the optical base element and the functional film structure so as to permanently retain said functional film structure on the surface of the optical base element.

The invention is directed to the use of a pressure-sensitive adhesive layer of optical quality having a storage modulus G' below $1.6\ 10^5$ Pa at 85° C. and demonstrating a dry peel force strength and a wet peel force strength both above 20 N/25 mm, preferably both in the range of 21 to 40N/25 mm inclusive for the manufacturing of a laminated optical element with improved edging performances.

Here again, all the features described above for the different elements of the functionalized laminated optical element of course apply to method for improving edging performance of a laminated optical element as well as the use of a pressure-sensitive adhesive layer of optical quality.

This invention will be better understood in light of the following examples which are given for illustration purposes only and do not intend to restrict in any way the scope of the appended claims.

EXAMPLES

Manufacturing of a Polarized Semi-Finished Lens:

The aim of the tests was to demonstrate that the choice of adhesive was responsible for the improved wheel edging performance.

At least 8 different pressure-adhesives layers (PSA) of thickness of about 50 microns including the pressure sensitive adhesive sold by 3M under the reference 8146-2 were compared.

For all the tests or samples:
- The storage modulus (G') as well as the dry peel strength and the wet peel force strength for each system, for each pressure-sensitive adhesive layer were measured.
- the functional film structure used was a Cellulose Triacetate film (TAC) (in particular the FT80SZ film provided by Fuji®);
- the optical base element used was a semi-finished lens having a refractive index of 1.67 commercialised by Essilor International under the reference Stylis®;
- the pressure-sensitive layer adhesive was applied on the functional structured layer;
- the functional film structure was applied on the convex face of the lens;
- the lamination process used was the one described in patent EP2 170 584;
- At least 20 laminated samples, preferably at least 30 lenses were manufactured per each kind of PSA
- One half of the laminated samples or laminated semi-finished lenses was then edged with a Kappa© (trade name) edger machine while the other half was then edged with a Mr Blue® (trade name) edger machine, both distributed by Essilor.
- Once edged, the laminated samples or semi-finished lenses were inspected to determine if there were cosmetic defects such as delamination between the functional films and the lens.

The storage modulus G' was measured with ARES® Rheometer sold by TA Instrument, on a test sample cut in a disc shape of a 7.9 mm diameter and about 2 mm thickness.

4 pieces of pressure sensitive adhesive layers were stacked to form the test sample of about 2 mm thickness. The test sample cut in a disc shape was then placed between parallel plates; and while applying a shear strain at a frequency of 1 Hz the viscoelasticity was measured in the shear mode over a temperature range of −40° C. to 100° C. at a heating rate of 5° C./min.

The dry peel strength and the wet peel strength were both measured according to ASTM D 3330/D 3330 M Standard Test Method by peeling off the TAC film and the pressure-sensitive adhesive layer in the 90° peeling off direction at a speed of 2.54 cm/min.

The equipment used for such test was typically a traction machine distributed by Instron®.

The peel test consisted more specifically of laminating a strip of the pressure-sensitive adhesive layer 25×70 mm in size on a strip of the functional film structure. The resulting strip (i.e the functional film structure+pressure-sensitive adhesive layer) is then bonded onto a support onto which the optical element has been previously attached. The laminated optical element (i.e the tested sample) is conditioned at least 24 hours (at 23 C±3 C, 50% RH±10%) before peeling.

The functional film structure+pressure sensitive adhesive material is then peeled at an angle of 90° at a speed of 2.54 cm/min.

Halfway through the test, few drops of water optionally containing a wetting agent are added to the interface or the crack opening for measuring the wet peel force.

Software continuously measures the peel force according to displacement. This force is averaged over a length of 10 mm for dry peeling and 15 mm for wet peeling. The forces under dry and wet conditions are both expressed in N/25 mm.

The PSA samples were tested on two different kinds of edging machines and were tested at different dates. At least 20 lenses, preferably at least 30 lenses were manufactured per each kind of PSA sample.

The edging yields were measured on batches of at least 5 laminated semi-finished lenses with the same PSA and same edging machine.

A laminated lens was considered as failed as long as any part of the PSA or the functional film has been delaminated from the lens, respectively the PSA, the detached element being entire removed or still attached to the lens by means of another part of the PSA and/or functional film.

The following table 1 shows the impact of the choice of some of the PSA properties identified by the inventors on the quality of the lenses after the edging processes.

It is surprising that the combination of a storage modulus of less than $1.6 \cdot 10^5$ Pa, a dry peel strength and a wet peel strength above 20N/25 mm bring the best results on edging.

TABLE 1

| Tested PSA | A | B | C | D | E | F | G |
|---|---|---|---|---|---|---|---|
| Dry peel strength D (N/25 mm) | 8 | 15.5 | 21.9 | 22 | 21 | 25.4 | 23.5 |
| Wet peel strength W (N/25 mm) | 6 | 16.1 | 22.2 | 23 | 22 | 26.1 | 24.3 |
| Difference (W − D)/D | 25% | 4% | 1.5% | 4.5% | 5% | 0.3% | 3.5% |
| G' ($10^5$ Pa) | 1.35 | 1.4 | 1.9 | 1.5 | 1.5 | 1.45 | 1.3 |
| Acrylic PSA | yes | yes | yes | yes | yes | yes | yes |
| Silane coupling agent | no | yes | yes | yes | yes | yes | yes |
| Tackifier | no | no | no | no | no | yes | yes |
| Edging Yield (%) | 10 | 50 | 20 | 75 | 90 | 100 | 90 |

In this table, the values of G' are rounded to the closest $0.05 \cdot 10^5$ Pa.

When the PSA layer 8146-2 sold by 3M was tested on multiple lots of 5 lenses at different dates, and using different edging tools, the edging yield was non consistent, some lots having 100% yield, some 20% and most in-between.

PSA made of composition A is a PSA with a low dry and wet Peel strength, a high dry-wet variation of peel strength, no tackyfier agent and has an edging yield of about 10%.

PSA made of composition B is a PSA chosen with a higher dry and wet Peel strength, but as seen in table 1, the dry and wet Peel strength are still below 20. Accordingly the edging yield is smaller than 55%, with a mean of 50%.

PSA of made of composition C is a PSA chosen with an even higher dry and wet Peel strength, however it has been designed to have a G' greater than 1.6, with a value of $1.9 \cdot 10^5$ Pa. This other comparative example further illustrates that having a G' greater than 1.9 is a factor of low edging yields.

None of the comparative examples have a consistent yield of greater than about 55%. None of the comparative examples have both a dry and wet peel strength greater than 20 N/20 mm and a G' smaller than 1.6 10⁵ Pa.

PSA of made of compositions D and E are different PSA designed to have a dry and wet Peel strength above 20 and a G' below 1.6 but were manufactured without using a tackifier agent.

The inventors have found that using PSA satisfying only those two parameters (the dry and wet Peel strength above 20 and a G' below 1.6) allows to reach an edging yield of greater than 60%, and as can be seen in Table 1, in particular of 75% for PSA D and of 90% for PSA E.

PSA made of compositions F and G are different PSA designed to have a dry and wet Peel strength above 20 and a G' below 1.6 but were manufactured using a tackifier agent, The inventors have found that using PSA comprising a tackifier agent on top of satisfying the above two parameters leads to consistent yields of greater than 85%, in particular yields of 90% and above, and as can be seen in Table 1, in particular of 90% for PSA G and of 100% for PSA F.

The yield value specified in Table 1 corresponds to the yield for at least 20 lenses, preferably for at least 30 lenses.

The invention claimed is:

1. A functionalized laminated optical element comprising:
    an optical base element;
    a functional film structure consisting of a single layer or a multilayer structure; and
    a layer of a pressure-sensitive adhesive of optical quality between one surface of the optical base element and the functional film structure to permanently retain the functional film structure on the surface of the optical base element:
wherein the pressure-sensitive adhesive layer comprises an acrylic polymer (A), has a storage modulus G' of $1.0 \times 10^5$ Pa or greater and below $1.6 \times 10^5$ Pa at 85° C. and a dry peel strength and a wet peel force strength both above 20 N/25 mm, wherein the acrylic polymer (A) contains a hydroxyl group-containing monomer as a monomer unit, and 50% by weight or more of (meth)acrylic acid alkyl ester having a linear or branched-chain C1-20 alkyl group as a monomer unit, and wherein the optical base element is a finished lens, a semi-finished lens, a progressive addition lens, an afocal lens, a plano lens, a unifocal lens, and/or a multifocal lens, wherein the pressure-sensitive adhesive layer has a thickness in the range of 40 μm to 150 μm inclusive.

2. The functionalized laminated optical element of claim 1, wherein the optical base element is an optical base element made from (thio) urethane based pre-polymer or an episulfide monomer, wherein the functional film structure comprises at least one support film, and wherein the support film is fixed to the optical base element by means of the pressure-sensitive adhesive layer and is selected from the group consisting of films made of cellulose triacetate (TAC), cellulose acetate butyrate (CAB), polycarbonate (PC), poly (ethylene terephthalate) (PET), poly(methylmethacrylate) (PMMA), urethane polymer (TPU), cyclo olefin copolymer (COC), polyether block amide block copolymer, and/or a polyimide.

3. The functionalized laminated optical element of claim 1, wherein the storage modulus G' of the pressure-sensitive adhesive layer is $1.0 \times 10^5$ Pa or greater and below or equal to $1.5 \times 10^5$ Pa at 85° C. and a dry peel strength and a wet peel force strength both in the range of 21 to 40 N/25 mm inclusive.

4. The functionalized laminated optical element of claim 1, wherein the pressure-sensitive adhesive layer demonstrates a decrease between the dry peel force strength and the wet peel force strength less than or equal to 10%.

5. The functionalized laminated optical element of claim 4, wherein the optical base element is an optical base element made from (thio) urethane based pre-polymer or an episulfide monomer, wherein the functional film structure comprises at least one support film, and wherein the support film is fixed to the optical base element by means of the pressure-sensitive adhesive layer and is selected from the group consisting of films made of cellulose triacetate (TAC), cellulose acetate butyrate (CAB), polycarbonate (PC), poly (ethylene terephthalate) (PET), poly(methylmethacrylate) (PMMA), urethane polymer (TPU), cyclo olefin copolymer (COC), polyether block amide block copolymer, and/or a polyimide.

6. The functionalized laminated optical element of claim 1, wherein the pressure-sensitive adhesive layer comprises a tackifier agent.

7. The functionalized laminated optical element of claim 6, wherein the pressure-sensitive adhesive layer is made of a polyacrylate-based composition comprising:
    the acrylic polymer (A);
    a (meth) acrylic polymer (B), acting as the tackifier agent, that includes, as a monomer unit, a (meth) acrylic monomer having a tricyclic or higher alicyclic structure and that has a weight average molecular weight of 1000 or more and less than 30000; and
    an alkoxysilyl group containing monomer (C).

8. The functionalized laminated optical element of claim 7, wherein the (meth)acrylic polymer (B) is in a quantity within a range of 1 to 20 parts by weight based on 100 parts by weight of the acrylic polymer (A).

9. The functionalized laminated optical element of claim 7, wherein the alkoxysilyl group containing monomer (C) is a gamma-glycidoxypropyltrimethoxysilane, gamma-glycidoxypropyltriethoxysilane, gamma-aminopropyltrimethoxysilane, or N-phenyl-aminopropyltrimethoxysilane.

10. The functionalized laminated optical element of claim 7, wherein the alkoxysilyl group containing monomer (C) is in a quantity within the range of 0.1 to 1.0 parts by weight based on 100 parts by weight of the acrylic polymer (A).

11. The functionalized laminated optical element of claim 1, wherein the optical base element is an optical base element made from (thio) urethane based pre-polymer or an episulfide monomer.

12. The functionalized laminated optical element of claim 1, wherein the functional film structure includes one or more tinted film, polarizing film, photochromic film, hard coat film, top coat film, anti-fog film, anti-smudge film, anti-reflective film and/or anti-static film.

13. The functionalized laminated optical element of claim 1, wherein the functional film structure comprises at least one support film.

14. The functionalized laminated optical element of claim 13, wherein the support film is selected from the group consisting of films made of cellulose triacetate (TAC), cellulose acetate butyrate (CAB), polycarbonate (PC), poly (ethylene terephthalate) (PET), poly(methylmethacrylate) (PMMA), urethane polymer (TPU), cyclo olefin copolymer (COC), polyether block amide block copolymer and Polyimides.

15. The functionalized laminated optical element of claim 14, wherein the support film is a film made of the cellulose triacetate (TAC) having a thickness in the range of 40 μm to 300 μm inclusive.

16. The functionalized laminated optical element of claim 1, wherein the pressure-sensitive adhesive layer further comprises a silane coupling agent.

17. A method for manufacturing an functionalized laminated optical base element of claim 1 comprising:
providing an optical base element chosen from a finished lens, a semi-finished lens, a progressive addition lens, an afocal lens, a plano lens, a unifocal lens, and/or a multifocal lens;
providing a layer of a pressure-sensitive adhesive of optical quality;
providing a functional film structure; and
laminating the functional film structure to the optical base element, with the a layer of a pressure-sensitive adhesive of optical quality disposed between the functional film structure and the optical base lens so as to retain permanently the functional film structure on the surface of the optical base lens;
wherein the layer of a pressure-sensitive adhesive of optical quality comprises an acrylic polymer (A), has a storage modulus G' of $1.0 \times 10^5$ Pa or greater and below $1.6 \times 10^5$ Pa at 85° C. and demonstrates both a dry peel force strength and a wet peel force strength above 20 N/25 mm, and wherein the acrylic polymer (A) contains a hydroxyl group-containing monomer as a monomer unit, and 50% by weight or more of (meth)acrylic acid alkyl ester having a linear or branched-chain C1-20 alkyl group as a monomer unit.

18. The method for manufacturing a functionalized laminated optical element of claim 17 further comprising:
surfacing the optical base element;
coating the surfaced optical element; and
edging the coated optical element.

19. A method for improving edging performance of a laminated optical element comprising:
laminating a functional film structure to an optical base element chosen from a finished lens, a semi-finished lens, a progressive addition lens, an afocal lens, a plano lens, a unifocal lens, and/or a multifocal lens with a pressure-sensitive adhesive layer of optical quality comprising an acrylic polymer (A), having a storage modulus G' of $1.0 \times 10^5$ Pa or greater and below $1.6 \times 10^5$ Pa at 85° C., and wherein the acrylic polymer (A) contains a hydroxyl group-containing monomer as a monomer unit, and 50% by weight or more of (meth)acrylic acid alkyl ester having a linear or branched-chain C1-20 alkyl group as a monomer unit; and
demonstrating a dry peel force strength and a wet peel force strength both above 20 N/25 mm;
wherein the pressure-sensitive adhesive layer is between one surface of the optical base element and the functional film structure so as to permanently retain the functional film structure on the surface of the optical base element.

* * * * *

UNITED STATES PATENT AND TRADEMARK OFFICE
CERTIFICATE OF CORRECTION

PATENT NO. : 11,772,343 B2  
APPLICATION NO. : 16/089143  
DATED : October 3, 2023  
INVENTOR(S) : Violaine Coue et al.

Page 1 of 1

It is certified that error appears in the above-identified patent and that said Letters Patent is hereby corrected as shown below:

On the Title Page

(73) Assignee:
Add: Nitto Denko Corporation, Osaka (JP)

Signed and Sealed this  
Thirty-first Day of October, 2023

Katherine Kelly Vidal  
*Director of the United States Patent and Trademark Office*